(12) United States Patent
Hwang et al.

(10) Patent No.: US 10,303,172 B2
(45) Date of Patent: May 28, 2019

(54) UNMANNED AERIAL VEHICLE HAVING AUTOMATIC TRACKING FUNCTION AND METHOD OF CONTROLLING THE SAME

(71) Applicant: EYEDEA INC., Seoul (KR)

(72) Inventors: Jinbyuk Hwang, Seoul (KR); Ju Hong Park, Incheon (KR); Jang Dong Im, Bucheon-si (KR); Hyo Jin Park, Seoul (KR)

(73) Assignee: EYEDEA INC., Seoul (KR)

( * ) Notice: Subject to any disclaimer, the term of this patent is extended or adjusted under 35 U.S.C. 154(b) by 0 days.

(21) Appl. No.: 15/556,203

(22) PCT Filed: Feb. 27, 2016

(86) PCT No.: PCT/KR2016/001970
§ 371 (c)(1),
(2) Date: Sep. 6, 2017

(87) PCT Pub. No.: WO2017/030259
PCT Pub. Date: Feb. 23, 2017

(65) Prior Publication Data
US 2018/0046188 A1   Feb. 15, 2018

(30) Foreign Application Priority Data

Aug. 19, 2015   (KR) ........................ 10-2015-0116709

(51) Int. Cl.
*H04N 7/18*          (2006.01)
*B64D 47/08*         (2006.01)
(Continued)

(52) U.S. Cl.
CPC ........... *G05D 1/0094* (2013.01); *B64C 39/02* (2013.01); *B64C 39/024* (2013.01); *B64D 47/08* (2013.01);
(Continued)

(58) Field of Classification Search
CPC ......... B64C 39/02; B64C 27/08; B64C 13/20; G06T 7/215; G05D 1/0094; G01S 17/89;
(Continued)

(56) References Cited

U.S. PATENT DOCUMENTS

| | | | |
|---|---|---|---|
| 7,789,341 B2 | 9/2010 | Arlton et al. | |
| 8,274,578 B2 | 9/2012 | Hong et al. | |

(Continued)

FOREIGN PATENT DOCUMENTS

| | | |
|---|---|---|
| CN | 104777847 A | 7/2015 |
| JP | 2009-202737 A | 9/2009 |

(Continued)

OTHER PUBLICATIONS

Piotr Rudol et al., Human Body Detection and Geolocalization for UAV Search and Rescue Missions Using Color and Thermal Imagery, IEEEAC Paper, Dec. 13, 2007, pp. 1-8, Department of Computer and Information Science, Link¨ oping, Sweden.

*Primary Examiner* — Yuri Kan
(74) *Attorney, Agent, or Firm* — Novick, Kim & Lee, PLLC; Jae Youn Kim

(57) ABSTRACT

The present invention relates to an unmanned aerial vehicle having an automatic tracking function and a control method thereof, the unmanned aerial vehicle comprising: an image input unit for acquiring an image of a peripheral image of a subject to be photographed; an object recognition unit for extracting a region of interest using the image acquired through the image input unit, detecting a specific region located within the region of interest to measure coordinates, and recognizing the specific region as an object to be tracked; an object tracking unit for calculating and tracking a position of the object to be tracked recognized by the object recognition unit using a tracking learning detection (TLD) learning algorithm and generating a drive command for driving the unmanned aerial vehicle corresponding to the (Continued)

position; a motion recognition unit for recognizing a motion of the object to be tracked and generating a driving command corresponding to a photographing mode, a moving picture photographing mode, and a return mode; and a drive control unit for driving the unmanned aerial vehicle according to the drive command. Due to this feature, the present invention has an effect of enabling autonomous flight of an unmanned aerial vehicle by recognizing and automatically tracking an object to be tracked.

13 Claims, 11 Drawing Sheets

(51) Int. Cl.
| | |
|---|---|
| *H04N 5/232* | (2006.01) |
| *G01S 17/89* | (2006.01) |
| *B64F 1/36* | (2017.01) |
| *G05D 1/00* | (2006.01) |
| *B64C 39/02* | (2006.01) |
| *G05D 1/12* | (2006.01) |
| *G06K 9/00* | (2006.01) |
| *G08G 5/00* | (2006.01) |

(52) U.S. Cl.
CPC .............. *G05D 1/12* (2013.01); *G06K 9/0063* (2013.01); *G08G 5/0021* (2013.01); *G08G 5/0069* (2013.01); *G08G 5/0078* (2013.01); *B64C 2201/123* (2013.01); *B64C 2201/127* (2013.01); *B64C 2201/141* (2013.01); *G06T 2207/30232* (2013.01)

(58) Field of Classification Search
CPC .. B64F 1/36; H04N 5/232; H04N 7/18; B64D 47/08
See application file for complete search history.

(56) References Cited

U.S. PATENT DOCUMENTS

| | | | |
|---|---|---|---|
| 9,026,272 B2 | 5/2015 | Kokkeby et al. | |
| 9,536,320 B1 * | 1/2017 | Prince | .................... G01S 17/89 |
| 2005/0165517 A1 | 7/2005 | Reich | |
| 2012/0154579 A1 * | 6/2012 | Hampapur | .............. G06T 7/215 |
| | | | 348/143 |
| 2014/0211987 A1 | 7/2014 | Fan et al. | |
| 2016/0309124 A1 * | 10/2016 | Yang | .................... G05D 1/0094 |
| 2017/0152060 A1 * | 6/2017 | Morisawa | ............... B64C 27/08 |
| 2018/0086433 A1 * | 3/2018 | Ichihara | .................. B64C 13/20 |

FOREIGN PATENT DOCUMENTS

| | | | | |
|---|---|---|---|---|
| JP | 2010124398 A | * | 6/2010 | ............. H04N 5/232 |
| JP | 2013119328 A | * | 6/2013 | ................ B64F 1/36 |
| JP | 2014-119828 A | | 6/2014 | |
| KR | 10-2010-0129143 A | | 12/2010 | |
| KR | 10-1157484 B1 | | 6/2012 | |
| KR | 10-2013-0009895 A | | 1/2013 | |
| KR | 10-2013-0067847 A | | 6/2013 | |
| KR | 10-2013-0086192 A | | 7/2013 | |
| KR | 10-1313908 B1 | | 10/2013 | |

* cited by examiner

UNMANNED AERIAL VEHICLE HAVING AUTOMATIC TRACKING FUNCTION AND METHOD OF CONTROLLING THE SAME

TECHNICAL FIELD

The following description relates to an unmanned aerial vehicle and a method of controlling the same, and more particularly, to an unmanned aerial vehicle and a method of controlling the same, which may recognize and automatically track an object to be tracked by using external image information input to a camera mounted on the unmanned aerial vehicle.

BACKGROUND ART

Unmanned Aerial Vehicles (UAVs), such as drones, quadcopters, helicams, and the like, are commercialized and are used in various applications including camera shooting and the like.

Beyond the fields of broadcasting and military in which the UAVs were mainly used, ordinary users are beginning to use the UAVs in camera shooting for entertainment purposes.

However, the general UAV is inefficient in that a user is necessary to wirelessly control the UAV by using a remote controller (RC) and a smart user terminal. Further, considering characteristics of the UAV, in the case where a user manually controls the UAV on the ground, the user may frequently cause accidents with his inexperienced controlling, leading to damage to an expensive device or causing safety accidents.

Accordingly, there is an urgent need for a practical and applicable UAV, which may autonomously recognize and automatically track a subject to be photographed by a camera without control by a user, thereby preventing safety accidents and damage to an expensive UAV.

DISCLOSURE

Technical Problem

The present invention has been made to solve the above problem, and the present invention provides an unmanned aerial vehicle (UAV) and a method of controlling the same which may recognize and automatically track an object to be tracked by using external image information input to a camera mounted on the UAV, thereby enabling autonomous flight of the UAV and requiring no expensive tracking-guidance device, which reduces production costs of the UAV.

Technical Solution

According to an embodiment of the present invention, there is provided an UAV having an automatic tracking function to automatically track a subject to be photographed, the UAV including: an image input unit configured to acquire a peripheral image of the subject to be photographed; an object recognition unit configured to extract a region of interest by using the image acquired by the image input unit, to detect a specific region located within the region of interest to measure coordinates of the specific region, and to recognize the specific region as an object to be tracked; an object tracking unit configured to track the object to be tracked by calculating a position of the object to be tracked, which is recognized by the object recognition unit, by using a Tracking Learning Detection (TLD) algorithm, and to generate a drive command to drive the UAV corresponding to the calculated position; a motion recognition unit configured to recognize a motion of the object to be tracked to generate a drive command corresponding to a picture photographing mode, a moving picture photographing mode, and a return mode; and a drive control unit configured to drive the UAV according to the drive command of the object tracking unit and the motion recognition unit.

The UAV having an automatic tracking function according to an embodiment of the present invention may acquire the peripheral image of the object to be tracked while rotating in a moving direction of the object to be tracked; and in response to the object to be tracked not being found in the image, the UAV may recognize the object to be tracked by using a single panoramic image acquired while rotating at a same place.

The object recognition unit may detect the specific region from the image, acquired by the image input unit, by using a Haar-like feature, may increase a rate of determination of the detected specific region by using an AdaBoost learning algorithm, and may set coordinates of a window corresponding to the detected specific region to recognize the window as the object to be tracked.

In response to the object to be tracked being a human, the specific region may be a region corresponding to a face and an upper body.

The object tracking unit may include: a tracker configured to improve performance in tracking the object to be tracked by using an extended Kalman filter; a detector configured to generate a plurality of search windows for an entire input image, and to determine whether the object to be tracked exists in each of the search windows by using a stepwise classification algorithm; a trainer configured to improve performance of the detector in successively input images by using a semi-supervised learning algorithm; and a combiner configured to combine results of the tracker and the detector to finally determine the position of the object to be tracked, and to transmit coordinates of the position of the object to be tracked to the drive control unit.

The stepwise classification algorithm applied to the detector may enable real time processing by using a classification algorithm of a cascade structure that includes a patch variance, an ensemble classifier, and a nearest neighbor classifier.

The UAV having an automatic tracking function according to an embodiment of the present invention may further include a distance measuring unit stores scale values of image data of the object to be tracked which is recognized by the object recognition unit, and compares changes in a size of the object to be tracked, so that a constant distance between the object to be tracked and the UAV may be maintained.

The UAV having an automatic tracking function according to an embodiment of the present invention may further include an image storage unit configured to store image files captured in the picture photographing mode, and video files captured in the moving picture photographing mode, corresponding to a motion mode recognized by the motion recognition unit.

According to an embodiment of the present invention, there is provided a method of controlling an Unmanned Aerial Vehicle (UAV), which has an automatic tracking function to automatically track a subject to be photographed, the method including: a photographing process of acquiring a peripheral image of the subject to be photographed; a specific region detection process of detecting a face region and an upper body region from the image acquired in the photographing process; an object recognition process of measuring coordinates of a window corresponding to the face region and the upper body region detected as the specific region to recognize the window as the object to be tracked; an object tracking process of controlling the UAV to track the object to be tracked, which is recognized in the object recognizing process, while maintaining a constant distance from the object to be tracked; a motion recognizing process of recognizing a motion of the object to be tracked to determine a picture photographing mode, a moving picture photographing mode, and a return mode; and a UAV driving process of driving the UAV corresponding to a motion mode recognized in the motion recognition process.

The photographing process of acquiring the peripheral image of the subject to be photographed may include: acquiring the peripheral image of the object to be tracked by rotating the UAV in a moving direction of the object to be tracked; and in response to the object to be tracked not being found in the image, photographing by rotating the UAV at a same place.

The specific region detecting process may include detecting the specific region, which corresponds to the face region and the upper body region, from the image acquired in the photographing process by using a Haar-like feature, and increasing a rate of determination of the detected specific region by using an AdaBoost learning algorithm.

The object tracking process may include: improving performance in the object to be tracked by using an extended Kalman filter; generating a plurality of search windows for an entire input image; determining whether the object to be tracked exists in each of the search windows by using a stepwise classification algorithm of a cascade structure that includes a patch variance, an ensemble classifier, and a nearest neighbor classifier; and improving performance in successively input images by using a semi-supervised learning algorithm.

The object tracking process may include: storing scale values of image data of the object to be tracked; by using the stored scale values, sensing and storing changes in a size of the object to be tracked; by using the changes in the size of the object to be tracked, calculating movement coordinates of the UAV; and by using the calculated movement coordinates of the UAV, tracking the object to be tracked while maintaining a constant distance from the object to be tracked.

Advantageous Effects

As described above, according to the present invention, the unmanned aerial vehicle (UAV) and the method of controlling the same may recognize and automatically track a specific object by using external image information input to a camera mounted on the UAV, thereby enabling autonomous flight of the UAV and requiring no expensive tracking-guidance device, which reduces production costs of the UAV.

Further, according to the present invention, the UAV may autonomously travel, requiring no user terminal which is manually controlled by ordinary users, such that safety accidents caused by inexperienced users, and damage to the device may be prevented.

In addition, the present invention provides a method of finding an object to be tracked by using a single panoramic image created by stitching together a sequence of images captured while the UAV rotates, thereby improving a computation speed and recognition rate.

Moreover, when the face and the upper half of the human body are recognized, the present invention provides a method of automatically measuring coordinates to specify an object to be tracked, such that the UAV of the present invention may automatically track a specific target without control by a user.

Further, according to the present invention, by simply processing images input to the camera mounted on the UAV, an object may be specified and automatically tracked without a separate device, and a control command may be transmitted, thereby providing a convenient interface between a user and the UAV.

BEST MODE

Since the descriptions of the present invention are only presented to describe embodiments whose purpose is to describe the structures and/or functions of the present invention, it should not be construed that the scope of the present invention is limited to the embodiments set forth herein. That is, since various modifications to the embodiments may be made, and the embodiments may have different forms, it should be understood that the scope of the present invention may include equivalents which can implement the technical spirit of the present invention.

The meaning of terms described herein should be construed as follows:

Terms such as "first" and "second" are only used to distinguish one element from the other, and the scope the present invention should not be limited by these terms. For instance, the first element can be named the second element, and similarly the second element may be named the first element.

When one element is described as being "connected" to another element, it shall be construed as being connected to the other element directly but also as possibly having another element in between. On the other hand, if one element is described as being "directly connected" to another element, it shall be construed that there is no other element in between. Further, other expressions which describe the relationships between elements, i.e., "between" and "directly between" or "adjacent to" and "directly adjacent to," should be construed in the same manner.

Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or addition of one or more other characteristics, numbers, steps, operations, elements, parts or combinations thereof.

Reference characteristics (e.g., a, b, c, etc.) related to steps are used for convenience of description, and are not intended to describe the sequence of the steps. The steps may be performed in different sequences, as long as a specific sequence is not specifically described in the context. That is, the steps may be performed in a specified sequence, may be performed simultaneously, or may be performed in a reverse sequence.

Unless otherwise defined, all terms used herein have the same meaning as how they are generally understood by those of ordinary skill in the art to which the invention pertains. Any term that is defined in a generally-used dictionary shall be construed to have the same meaning in the context of the relevant art, and, unless otherwise defined explicitly, shall not be construed to have an idealistic or excessively formalistic meaning.

Hereinafter, embodiments of the present invention will be described with reference to the accompanying drawings.

Figure 1:
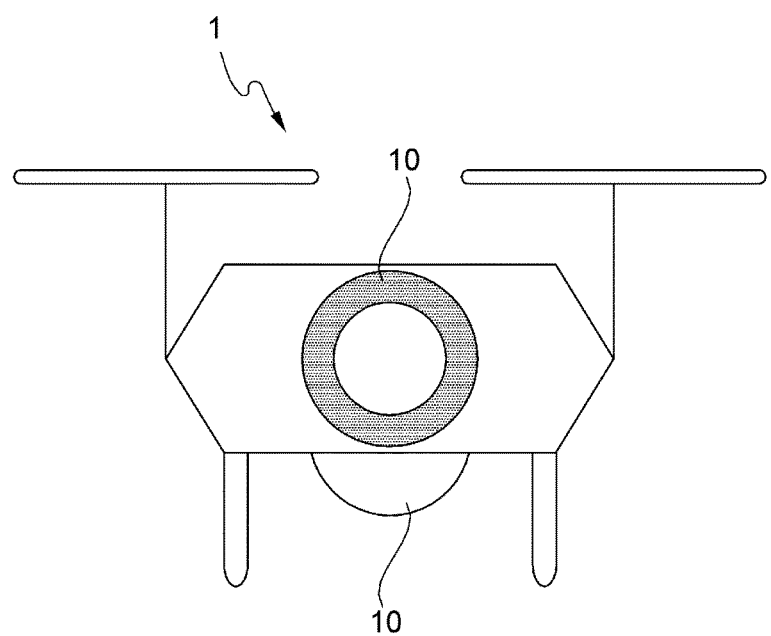
FIG. 1 is a schematic diagram illustrating a camera mounted on an Unmanned Aerial Vehicle (UAV) according to an embodiment of the present invention.

FIG. 1 is a schematic diagram illustrating a camera mounted on an Unmanned Aerial Vehicle (UAV) according to an embodiment of the present invention.

According to the embodiment of the present invention, the UAV having an automatic tracking function relates to an UAV that may automatically track a subject to be photographed. As illustrated in FIG. 1, the UAV may recognize and automatically track a specific object by using image information obtained by a camera 10 which is mounted on a front portion and a lower portion of the UAV 1 and captures an image of the subject to be photographed.

Here, FIG. 1 illustrates an example where the camera 10 is mounted on the front portion and the lower portion of the UAV 1, but the camera 10 is not limited thereto, and may be mounted on a rear portion and an upper portion of the UAV 1 depending on targets to be tracked and environments.

Figure 2:
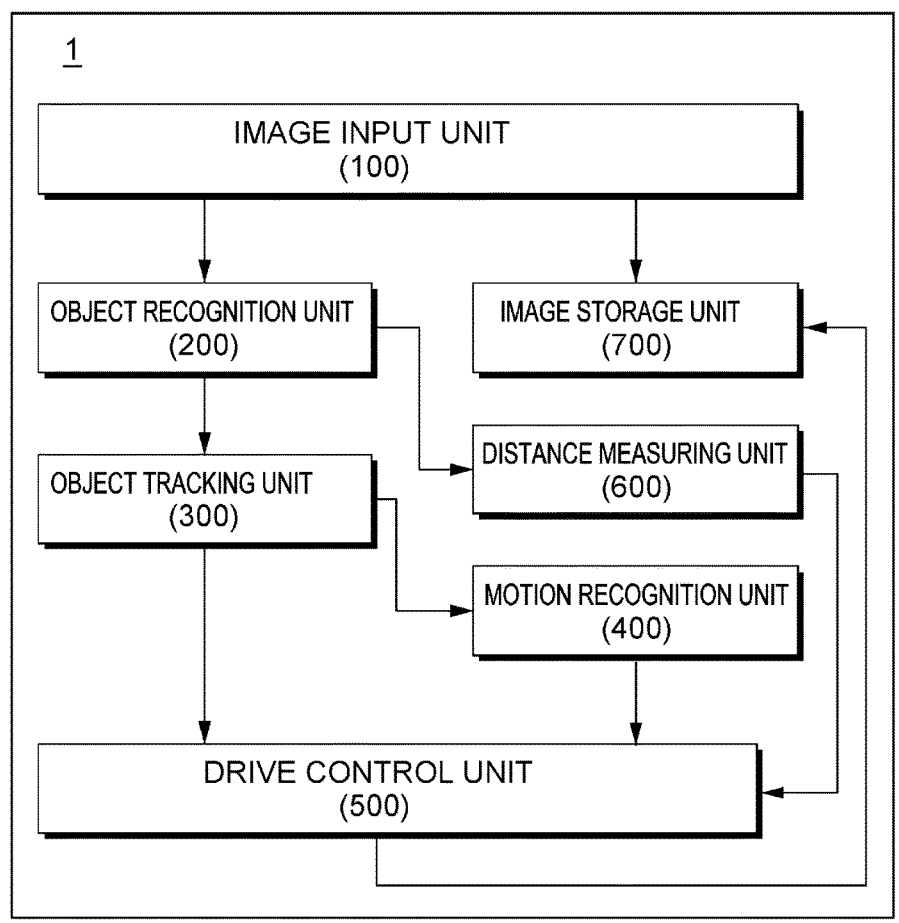
FIG. 2 is a block diagram illustrating the configuration of an UAV according to an embodiment of the present invention.

FIG. 2 is a block diagram illustrating the configuration of an UAV according to an embodiment of the present invention.

Referring to FIG. 2, the configuration of the UAV according to the embodiment of the present invention will be described in detail below.

As illustrated in FIG. 2, the UAV 1 may include an image input unit 100, an object recognition unit 200, an object tracking unit 300, a motion recognition unit 400, a drive control unit 500, a distance measuring unit 500, and an image storage unit 700.

More specifically, the image input unit 100 may be a means that acquires a peripheral image of a subject to be photographed. The image input unit 100 may be the camera 1 mounted on the UAV illustrated in FIG. 1, and according to the types of the UAV 1, the image input unit 100 may be various image acquisition units acquiring a peripheral image of a subject to be photographed.

In the embodiment, a peripheral image of an object to be tracked may be acquired while the UAV rotates in a movement direction of the object to be tracked which is the subject to be photographed. In the case where the object to be tracked is not found in the image, the object to be tracked may be recognized using a single panoramic image acquired while the UAV rotates at the same place.

Further, the object recognition unit 200 may detect a Region Of Interest (ROI) by using the image acquired by the image input unit 100, may detect a specific region located within the ROI to measure coordinates of the detected specific region, and may recognize the specific region as the object to be tracked.

In this case, the object recognition unit 200 may detect the specific region from the image, acquired by the image input unit, by using a Haar-like feature, may increase a rate of determination of the detected specific region by using an AdaBoost learning algorithm, and may set coordinates of a window corresponding to the detected specific region to recognize the specific region as the object to be tracked.

As in the embodiment of the present invention, in the case where the object to be tracked is a human, the specific region may be a region corresponding to the face and the upper body, and the Haar-like feature and the AdaBoost learning algorithm are face detection algorithms applied to the embodiment of the present invention.

Here, the Haar-like feature is mainly used for face detection, and has many prototypes, among which only the prototypes that may best represent the face are used by the AdaBoost learning algorithm, thereby enabling efficient face detection.

Further, the object tracking unit 300 may track the object to be tracked by calculating the position of the object to be tracked, which is recognized by the object recognition unit 200, by using a Tracking Learning Detection (TLD) algorithm, and at the same time, the object tracking unit 300 may generate a drive command, corresponding to the calculated position, to drive the UAV.

In this case, the object tracking unit 300 may include: a tracker 310 which may improve the performance in tracking the object to be tracked by using an extended Kalman filter; a detector 320 which generates a plurality of search windows for the entire input image, and determines whether the object to be tracked exists in each of the search windows by using a stepwise classification algorithm; a trainer 330 which may improve the performance of the detector in successively input images by using a semi-supervised learning algorithm; and a combiner 340 which combines results of the tracker 310 and the detector 320 to finally determine the position of the object to be tracked, and transmits coordinates of the position of the object to be tracked to the drive control unit 500.

In addition, the stepwise classification algorithm applied to the detector 320 may enable real-time processing by using a classification algorithm of a cascade structure that includes a patch variance 321, an ensemble classifier 322, and a nearest neighbor classifier 323.

Moreover, the motion recognition unit 400 may recognize the motion of the object to be tracked, and may generate a drive command corresponding to a picture photographing mode, a moving picture photographing mode, and a return mode. The drive control unit 500 may drive the UAV according to a drive command generated by the object tracking unit 300 and the motion recognition unit 400.

In this case, the drive command may include a moving direction, a moving distance, rotation, increase and decrease of altitude, take-off, and landing, of the UAV, as well as picture photographing and moving picture photographing by using a camera.

Further, the distance measuring unit 600 stores scale values of image data of the object to be tracked which is recognized by the object recognition unit 200, and compares changes in the size of the object to be tracked, such that a constant distance between the object to be tracked and the UAV may be maintained.

The image storage unit 700 may store image files captured in the picture photographing mode, and video files captured in the moving picture photographing mode, corresponding to a motion mode recognized by the motion recognition unit 400.

Figure 3:
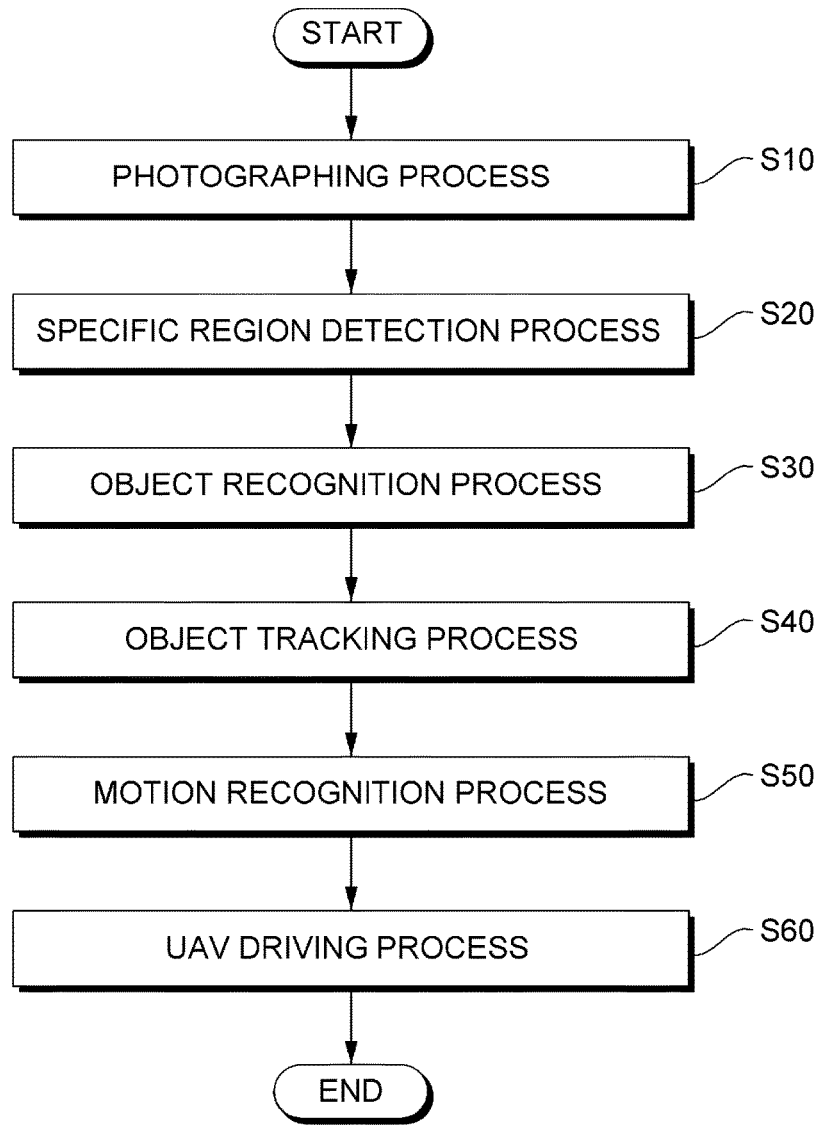
FIG. 3 is a flowchart illustrating a method of controlling an UAV according to an embodiment of the present invention.

FIG. 3 is a flowchart illustrating a method of controlling an UAV according to an embodiment of the present invention.

As illustrated in FIG. 3, the method of controlling the UAV having an automatic tracking function may include a photographing process in S10, a specific region detection process in S20, an object recognition process in S30, an object tracking process in S40, a motion recognition process in S50, and an UAV driving process in S60.

First, the photographing process in S10 is a process of photographing the surrounding of the object to be tracked, and may include: acquiring a peripheral image of the object to be tracked by rotating the UAV in a moving direction of the object to be tracked which is the subject to be photographed; and in the case where the object to be tracked is not found in the image, photographing by rotating the UAV at the same place.

Then, the specific region detection process in S20 is a process of detecting a face region and an upper body region from the image acquired in the photographing process.

Here, in the specific region detection process in S20, a specific region corresponding to the face region and the upper body region may be detected from the image, acquired in the photographing process in S10, by using the Haar-like feature, and a rate of determination of the detected specific region may be increased by using the AdaBoost learning algorithm.

Next, the object recognition process in S30 is a process of measuring coordinates of a window corresponding to the face region and the upper body region which are detected as the specific region, and recognizing the specific region as the object to be tracked.

Subsequently, the object tracking process in S40 is a process of controlling the UAV to track the object to be tracked, which is recognized in the object recognition process in S30, while maintaining a constant distance from the object to be tracked.

Then, the motion recognition process in S50 is a process of recognizing the motion of the object to be tracked, and determining a picture photographing mode, a moving picture photographing mode, and a return mode.

Next, the UAV driving process in S60 is a process of driving the UAV corresponding to the motion mode recognized in the motion recognition process.

Figure 4:
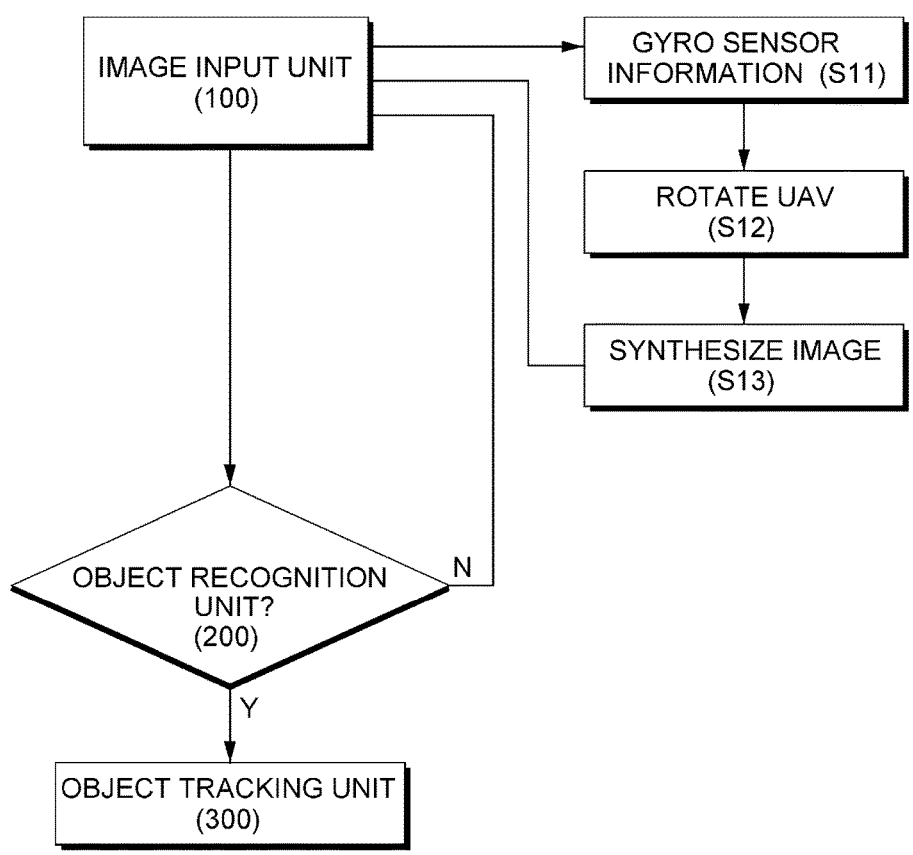
FIG. 4 is a flowchart explaining a photographing process in the flowchart of FIG. 3.
Figure 5:
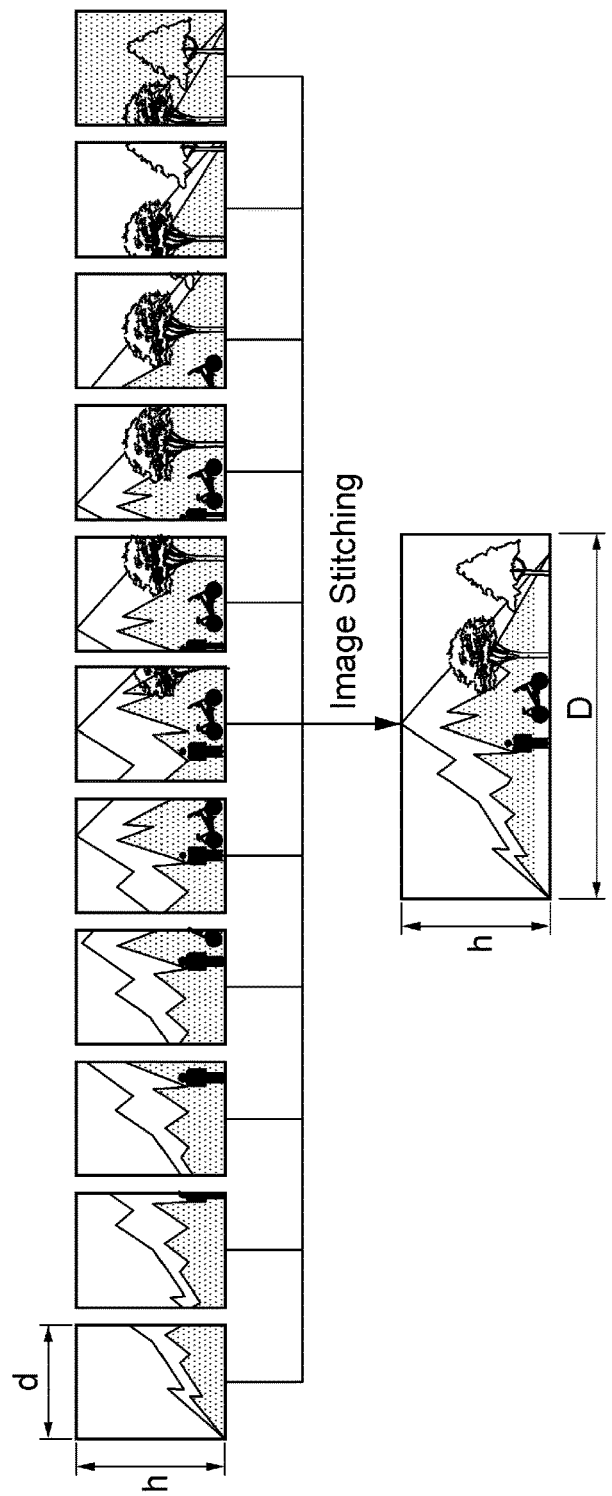
FIG. 5 is a schematic diagram illustrating an image stitching technique.

FIG. 4 is a flowchart explaining a photographing process in the flowchart of FIG. 3; and FIG. 5 is a schematic diagram illustrating an image stitching technique used for image composition illustrated in FIG. 4.

With reference to FIGS. 4 and 5, the photographing process in S10, which is illustrated in FIG. 3, will be described below.

As illustrated in FIG. 2, the UAV according to an embodiment of the present invention may acquire a peripheral image of an object to be tracked which is a subject to be photographed; and in the case where the object to be tracked is not found in the image, the UAV may track the object to be tracked while rotating at the same place.

That is, since most cameras generally have limitations on the Field of View (FOV), there may be cases where the subject to be photographed may be missed during tracking.

In order to avoid such cases, the UAV may rotate, while tracking, in a moving direction of the object to be tracked which is the subject to be photographed.

Further, as illustrated in the drawings, in the case where the object recognition unit 200, which recognizes the object to be tracked by using images input to the image input unit 100, fails to detect a specific region corresponding to the object to be tracked, the object to be tracked may be recognized by using gyro sensor information in S11 and by rotating the UAV at the same place in S12.

In this case, in order to detect the specific region, corresponding to the object to be tracked, by using the successive images captured during the rotation, it is required to use all the captured images to determine whether there is the specific region, corresponding to the object to be tracked, within each image.

Here, the number of images increases, the amount of computation increases. For this reason, in order to avoid this, the object to be tracked may be recognized not by using all the images captured during the rotation, but by using a single panoramic image (reference thesis [2]) created by stitching together the successive images captured during the rotation by using the image stitching technique (reference thesis [1]).

That is, instead of using a plurality of successive images, the specific region corresponding to the object to be tracked is detected from one panoramic image, thereby increasing the speed of calculation and a recognition rate.

FIG. 5 is a schematic diagram explaining the above-described image stitching technique. According to the embodiment of the present invention, while the UAV rotates at the same plate, a camera 10 may capture successive images at the interval of a constant rotation angle by using a gyro sensor, and may store the captured images in a memory (not shown).

In this case, in order to create a panoramic image by using all the successively captured images, the images may be synthesized using a generally-used image stitching technique in S13.

The image stitching technique will be described in further detail as follows. Images may be synthesized by: calculating fast feature points for all the images acquired by successive photographing, and calculating feature descriptors of the fast feature points; determining, to be match candidates, the feature points which are most similar in the Hamming distance between the feature descriptors in the successive images; removing an outer boundary line of match candidates by using Normalized Cross Correlation (NCC) between the match candidates, and gyroscope data; calculating a Homography Matrix (Reference thesis [3]) by using RANdom SAmple Consensus (RANSAC) for a relationship between the match candidates; and applying an alpha blending algorithm used to create a panoramic image.

Figure 6:
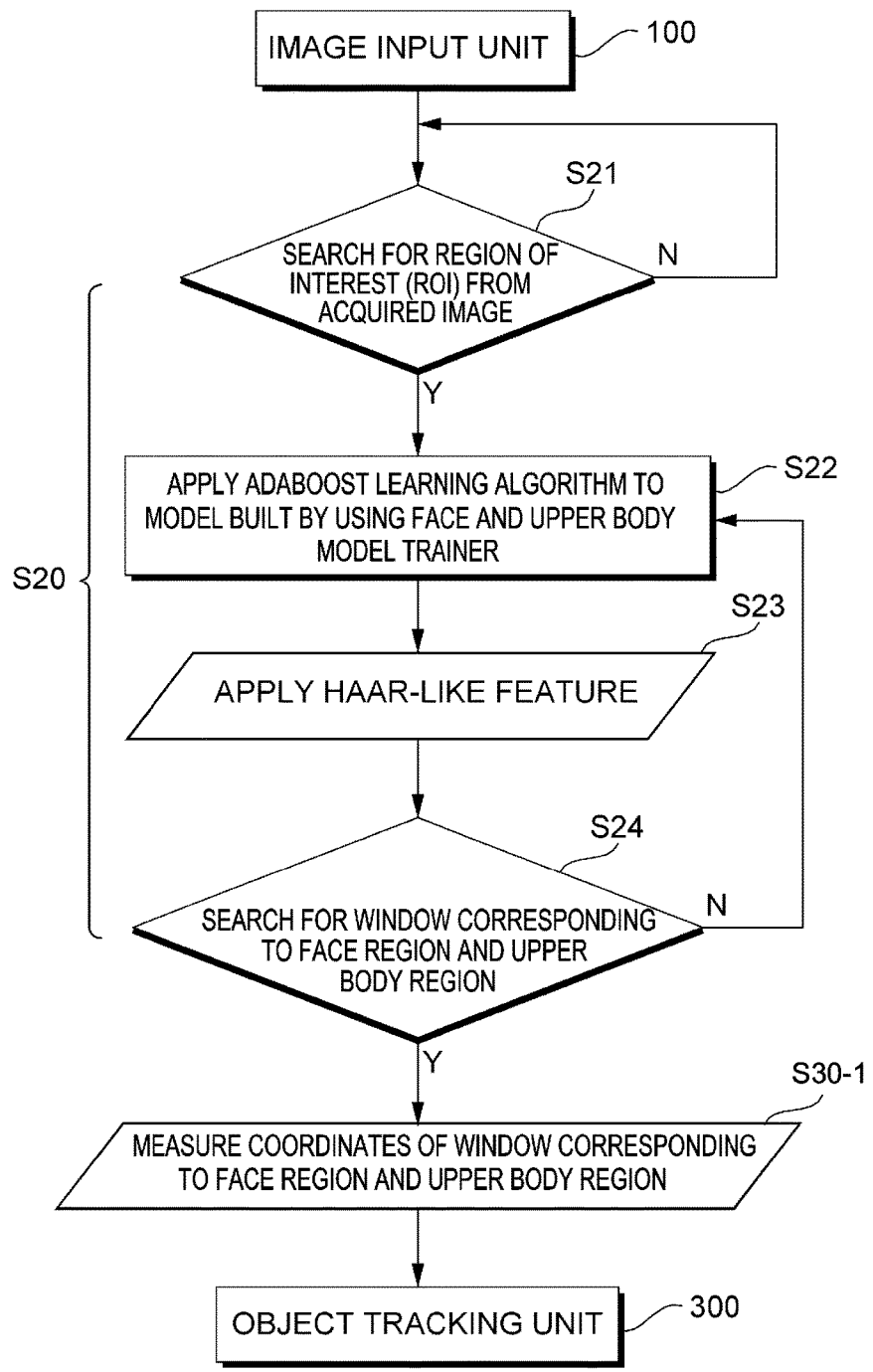
FIG. 6 is a flowchart explaining a specific region detection process and an object recognition process illustrated in the flowchart of FIG. 3.
Figure 7:
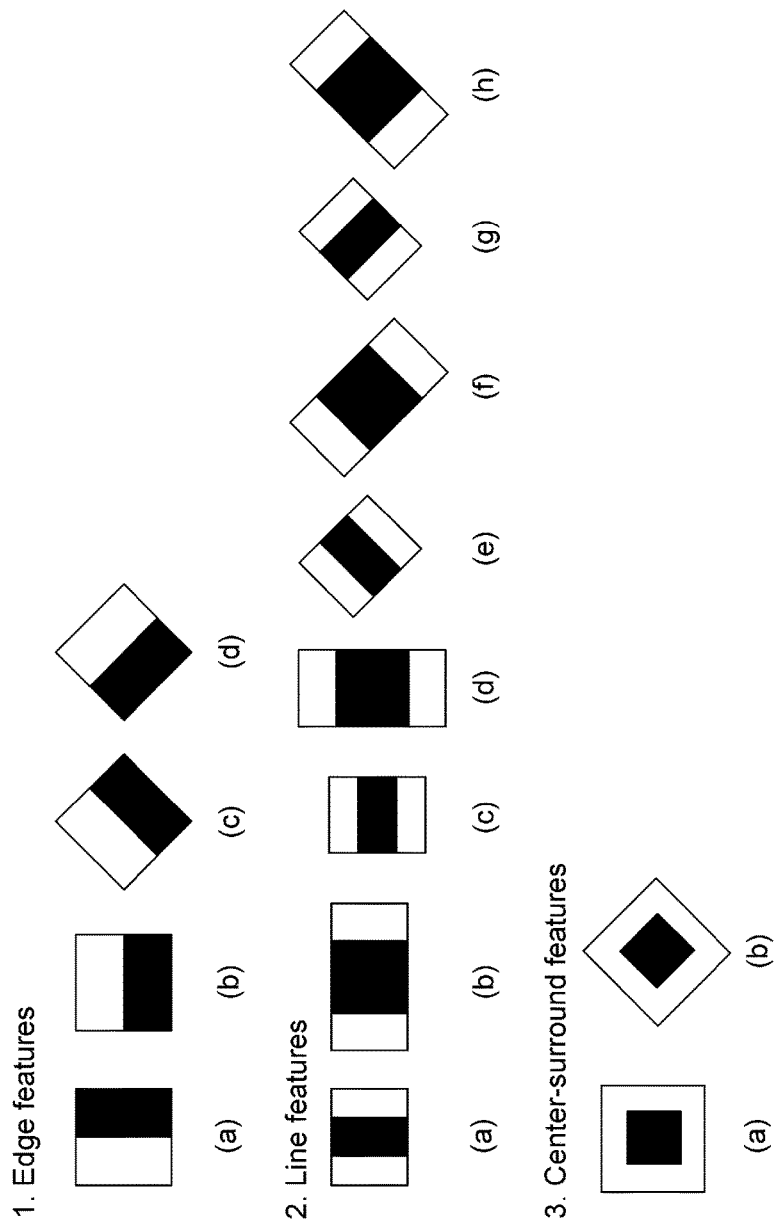
FIG. 7 is a schematic diagram explaining a Haar-like feature applied to an object recognition unit according to an embodiment of the present invention.

FIG. 6 is a flowchart explaining a specific region detection process and an object recognition process illustrated in the flowchart of FIG. 3; and FIG. 7 is a schematic diagram explaining a Haar-like feature applied to an object recognition unit according to an embodiment of the present invention.

As illustrated in FIG. 6, the specific region detection process in S20, which is illustrated in the flowchart of FIG. 3, includes: extracting a region of interest (ROI) in S21 from the image acquired by the image input unit 100; and then searching for a window corresponding to a face region and an upper body region in S24 by using the Haar-like feature in S23.

Here, the Haar-like feature consists of two or more adjacent rectangular regions having simple features, and its values may be defined as the difference in brightness between the regions.

Further, the object recognition process in S30, which is illustrated in the flowchart of FIG. 3, includes setting (measuring) coordinates of the searched window corresponding to the face region and upper body region (S30-1) so that the window may be recognized as the object to be tracked; and as illustrated in FIG. 6, the object may be recognized by applying the AdaBoost learning algorithm (Reference thesis [4]) to a model built by using the face and upper body model trainer in S22.

In this case, the object recognition unit 200 of FIG. 2 may use a classifier to classify objects and backgrounds. The classifier may be trained by using object samples (positive) and background samples (negative), in which the above-described AdaBoost learning algorithm may be used.

The AdaBoost learning algorithm is an algorithm that configures strong classifiers by combining weak classifiers of poor performance, in which the strong classifiers may be configured by repeating a process of decreasing the weighted value of samples correctly classified by the weak classifiers and increasing the weighted value of samples wrongly classified by the weak classifiers. The process may be repeated until the performance of the strong classifiers reaches a target level, and through the process, coordinates of a window corresponding to both the face region and the upper body region may be measured and the corresponding window may be designated as the object to be tracked.

Figure 8:
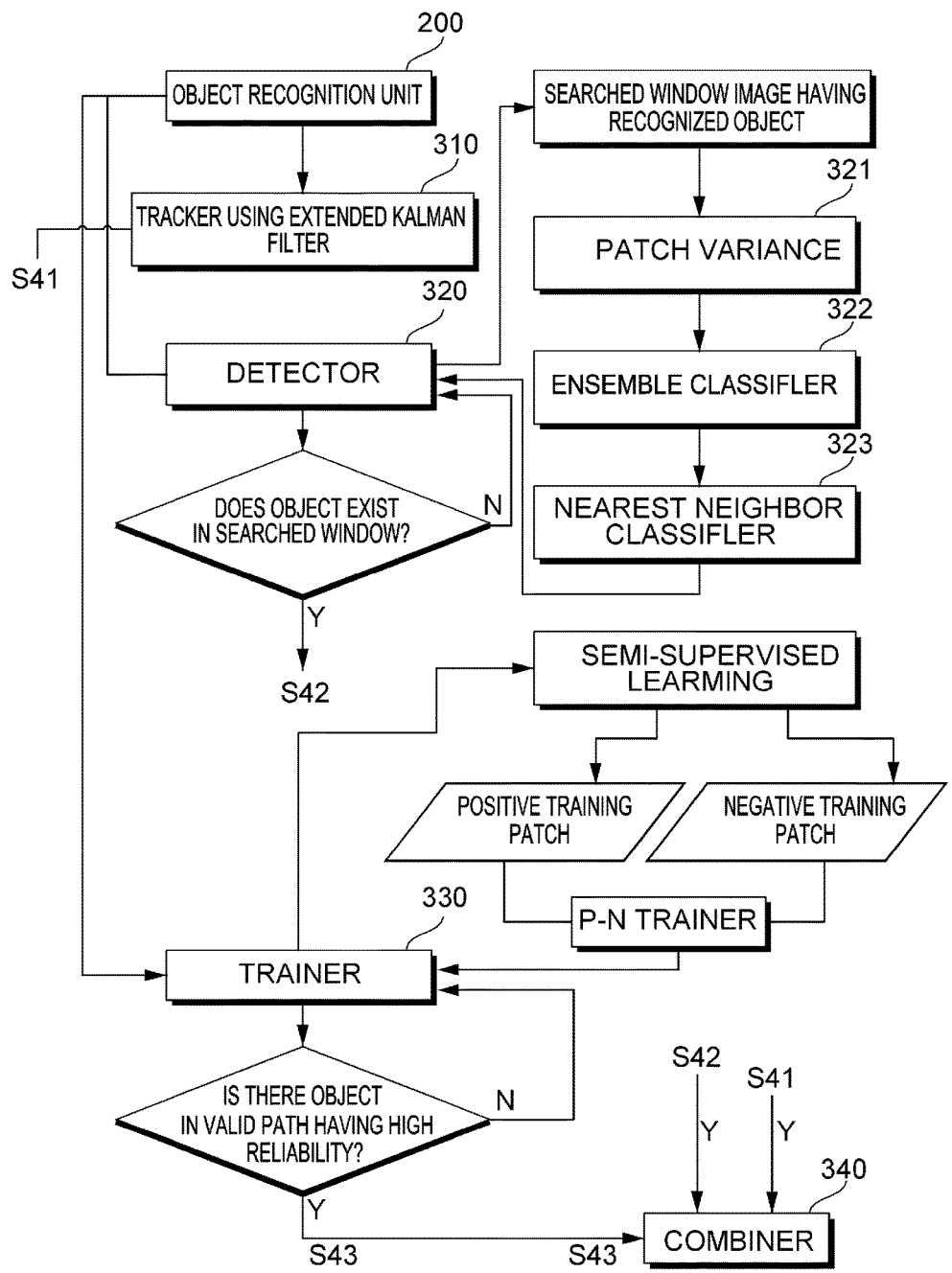
FIG. 8 is a flowchart explaining an object tracking process in the flowchart of FIG. 3.
Figure 9:
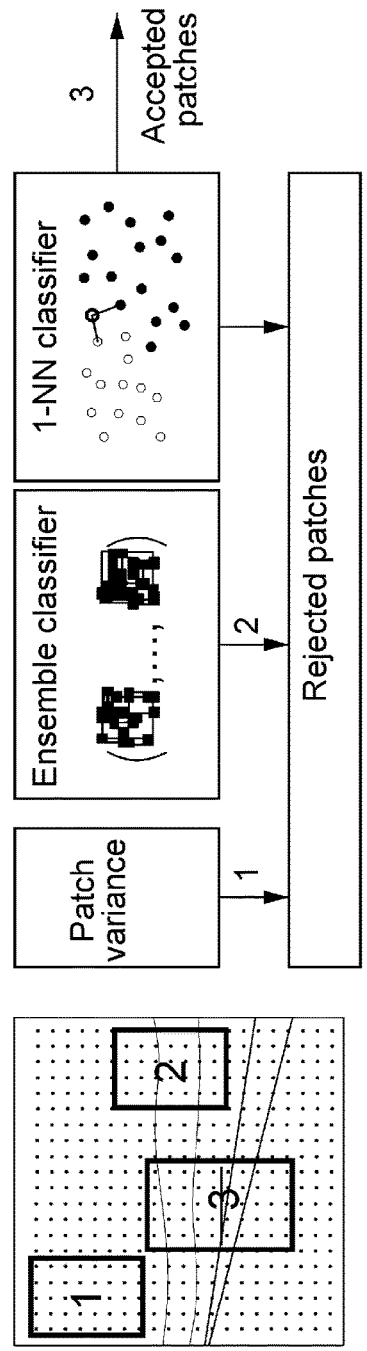
FIG. 9 is a flowchart explaining a stepwise classification algorithm applied to a detector illustrated in FIG. 8.

FIG. 8 is a flowchart explaining an object tracking process in the flowchart of FIG. 3; and FIG. 9 is a flowchart explaining a stepwise classification algorithm applied to a detector illustrated in FIG. 8.

As illustrated in the drawings, the object tracking process in S40 includes: increasing the performance in tracking the object to be tracked by using an extended Kalman filter in S41; generating a plurality of search windows for the entire input image, and determining whether the object to be tracked exists in each of the search windows by using a stepwise classification algorithm of a cascade structure that includes a patch variance, an ensemble classifier, and a nearest neighbor classifier in S42; and improving the performance in successively input images by using a semi-supervised learning algorithm in S43.

The object tracking process in S40 according to an embodiment of the present invention will be described in further detail below with reference to the drawings.

In the embodiment of the present invention, the object tracking process in S40 may include using a Tracking Learning Detection (TLD) algorithm (see reference theses [5] and [6]).

Once the object to be tracked is detected using the results of the object recognition unit 200, the object to be tracked may be tracked by using the TLD algorithm.

In the case where the object to be tracked or the UAV moves, there may be a change in a size (scale), a rotation angle, or a position, of a subject to be photographed corresponding to the object to be tracked. Further, the shape and feature of the subject may vary depending on a direction of viewing the subject. For this reason, the TLD algorithm is used, which may basically include a tracker 310, a detector 320, a trainer 330, and a combiner 340.

In the embodiment of the present invention, the tracker 310 may be a median filter, but in order to increase tracking performance, the tracker 310 may be an extended Kalman filter for tracking.

Further, the detector 320 may be a stepwise detector.

The detector 320 may generate search windows for the entire input image, and may determine whether the subject exists in each search window. The number of windows to search for all the regions of the input image may be determined according to the size of an initial bounding box.

In the embodiment of the present invention, the detector 320 may use a classifier having a cascade structure in order to determine in real time the presence of the subject in the search windows.

That is, a three-step classifier, including the patch variance 321, the ensemble classifier 322, and the nearest neighbor classifier 323, may be used and as illustrated in the drawings, it can be seen that once the presence of the subject is searched, data is transmitted to the combiner 340.

Further, the trainer 330 may be used to improve on-line the performance of the detector 320 in the input successive images.

In this case, a semi-supervised learning algorithm may be used in which previously labeled data and unlabeled input data are used for training.

The P-N trainer illustrated in the drawings may independently estimate an error of the classifier by using two types of patches, and may use wrongly classified examples as learning materials to re-train the classifier.

A positive training patch may assume that a subject moves along a path by using a temporal structure in the successive video images. The position of an object may be tracked by remembering the position of the object in a previous frame and by using the inter-frame tracker 310.

In the case of a high reliability of the patch determined by the tracker 310, the patch may be determined to be a valid path. In the case where the detector 320 recognizes negative in the valid moving path, the positive training patch may be generated, and in the case where the detector 320 detects a false-positive, the negative training patch may be generated. In addition, in the case where the position of the subject is in the valid moving path, surrounding patches of the position may be generated as the negative training patches.

The combiner 340 combines results of the tracker 310 and the detector 320 to finally output the position of the subject, and may transmit coordinates of the position to the drive control unit 500.

Figure 10:
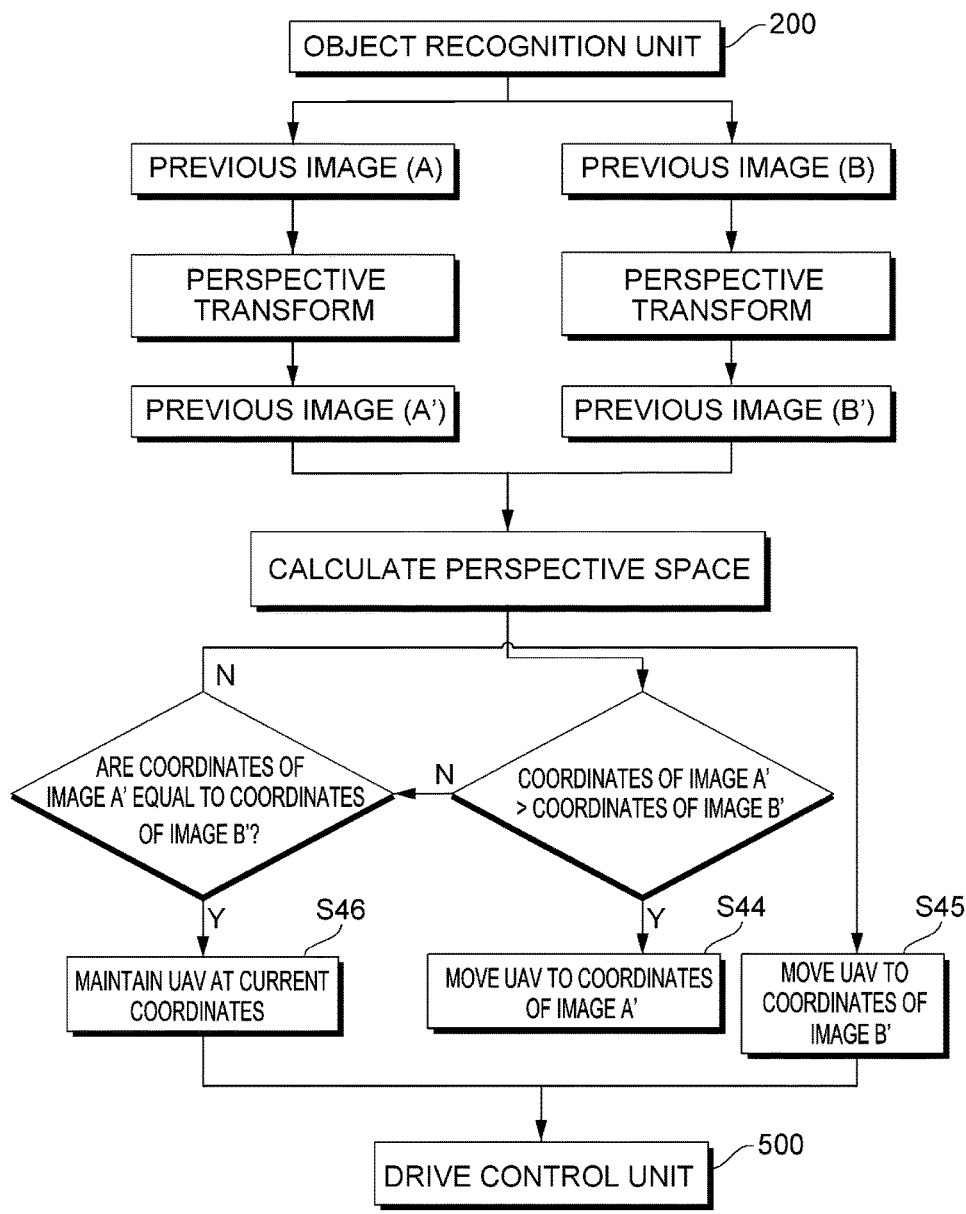
FIG. 10 is a flowchart explaining an operation of a distance measuring unit illustrated in FIG. 2.

FIG. 10 is a flowchart explaining an operation of a distance measuring unit illustrated in FIG. 2, which explains a process of tracking the object to be tracked at a constant distance away from the object, as described above in the object tracking process in S40.

The object tracking process in S40 may include: by using the distance measuring unit 600 illustrated in FIG. 2, storing scale values of image data of the object to be tracked; by using the stored scale values, sensing and storing changes in a size of the object to be tracked; by using the changes in the size of the object to be tracked, calculating movement coordinates of the UAV; and by using the calculated movement coordinates of the UAV, tracking the object to be tracked while maintaining a constant distance from the object to be tracked.

More specifically, in the case where an image A of a specific region detected by the object recognition unit 200 is changed to an image B, an image B' is generated by perspective transformation, and then a ratio (coordinates) of a scale value of an image A', which is a perspective-transformed image of the image A, and a scale value of the image B' may be calculated.

Here, a reference point is the image A' of the initial coordinates, such that the UAV may be maintained at the reference point.

As illustrated in FIG. 10, in the case of the image A'>the image B', the UAV is moved closer to the image A' within an error range in S44; in the case of the image A'<the image B', the UAV is moved closer to the image B' within an error range in S45; and in the case of the image A'=the image B', the UAV is maintained at the current position within an error range in S46.

Within the error range, coordinates twice the width, length, and height of the UAV are considered the same position.

Figure 11:
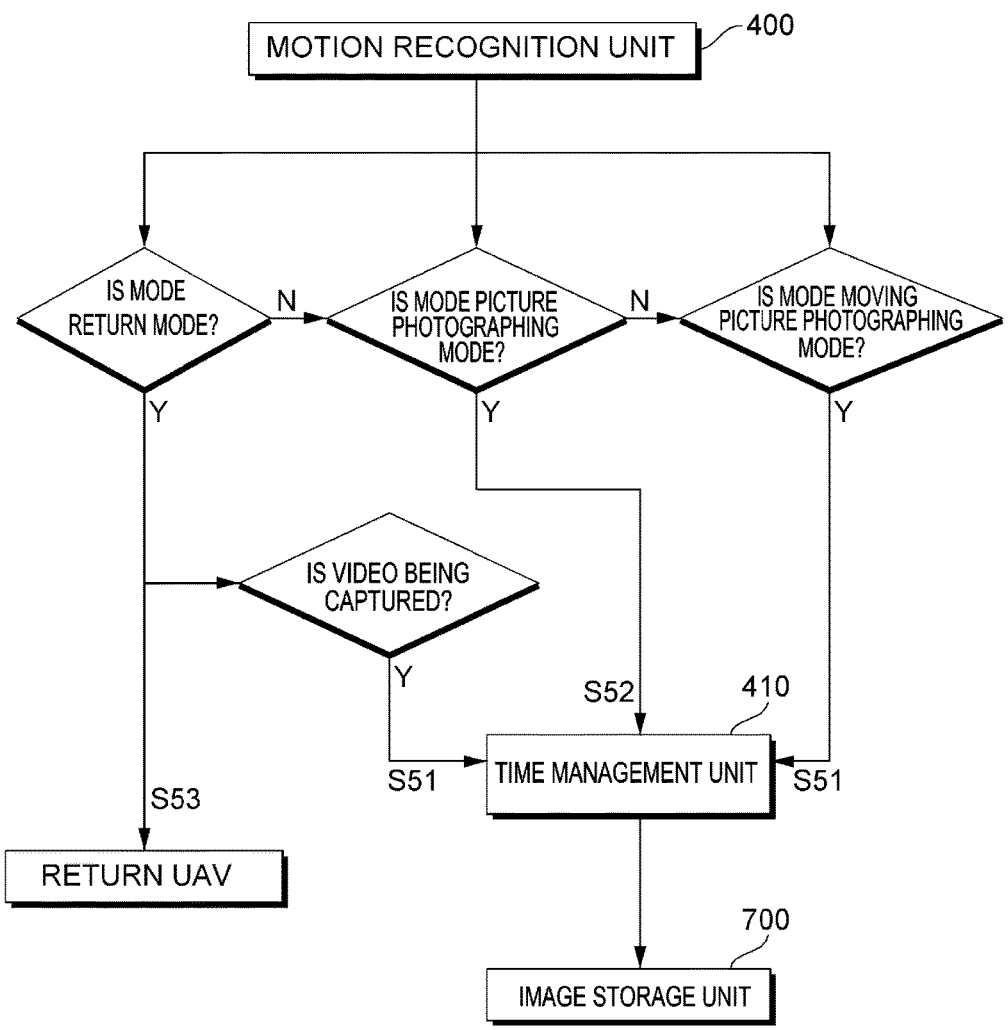
FIG. 11 is a flowchart explaining a motion recognition process illustrated in FIG. 3.

FIG. 11 is a flowchart explaining a motion recognition process illustrated in FIG. 3.

As illustrated in FIG. 11, once a subject (user) performs a predetermined operation such as a picture photographing mode, a moving picture photographing mode, a return mode, and the like, the motion recognition unit 400 may determine each mode.

Here, a determination method of the motion recognition unit 400 may be the same method as the method used in the object tracking process in S40, which is described in detail above with reference to FIGS. 8 and 9.

In the embodiment of the present invention, when the picture photographing mode is recognized, a predetermined period of time elapses at a time management unit 410, and then the drive control unit 500 controls the image storage unit 700 to compress the images input by the image input unit 100 into JPEG format and to store the compressed images.

Further, when the moving picture photographing mode is recognized, a video is captured for a period of time set by the time management unit 410, and the drive control unit 500 controls the image storage unit 700 to compress the images input by the image input unit 100 and to store the compressed images.

In addition, when the return mode is recognized, it is checked first whether a video is being captured, and then the UAV may return to a place where the subject (user) is located.

As described above, according to the present invention, the unmanned aerial vehicle (UAV) and the method of controlling the same may recognize and automatically track a specific object by using external image information input to a camera mounted on the UAV, thereby enabling autonomous flight of the UAV and requiring no expensive tracking-guidance device, which reduces production costs of the UAV.

Further, according to the present invention, the UAV may autonomously travel, requiring no user terminal which is manually controlled by ordinary users, such that safety accidents caused by inexperienced users, and damage to the device may be prevented.

In addition, the present invention provides a method of finding an object to be tracked by using a single panoramic image created by stitching together a sequence of images captured while the UAV rotates, thereby improving a computation speed and recognition rate.

Moreover, when the face and the upper half of the human body are recognized, the present invention provides a method of automatically measuring coordinates to specify an object to be tracked, such that the UAV of the present invention may automatically track a specific target without control by a user.

Further, according to the present invention, by simply processing images input to the camera mounted on the UAV, an object may be specified and automatically tracked without a separate device, and a control command may be transmitted, thereby providing a convenient interface between a user and the UAV.

While the present invention has been described herein with reference to the accompanying drawings, it should be understood that the aforementioned embodiments are illustrative in every aspect, and are not restrictive. Further, all changes which come within the meaning and range of equivalency of the claims are to be embraced within their scope without departing from the spirit and scope of the invention as defined by the following claims.

INDUSTRIAL APPLICABILITY

The present invention may be used in applications of the UAV and the method of controlling the same.

The invention claimed is:

1. An Unmanned Aerial Vehicle (UAV) having an automatic tracking function to automatically track an object to be photographed, the UAV comprising:
   an image input part configured to acquire a peripheral image of the object to be photographed, wherein the peripheral image is an image of surrounding environment around the object;
   an object recognition part configured to extract a region of interest by using the peripheral image acquired by the image input part, to detect a specific region located within the region of interest to measure coordinates of the specific region, and to recognize the specific region as the object to be tracked;
   an object tracking part configured to track the object to be tracked by calculating a position of the object to be tracked, which is recognized by the object recognition part, by using a Tracking Learning Detection (TLD) algorithm, and to generate a drive command to drive the UAV corresponding to the calculated position;
   a motion recognition part configured to recognize a motion of the object to be tracked to generate a drive command corresponding to a picture photographing mode, a moving picture photographing mode, and a return mode; and
   a drive controller configured to drive the UAV according to each drive command of the object tracking part and the motion recognition part.

2. The UAV of claim 1, wherein:
   the peripheral image of the object to be tracked is acquired while rotating the UAV in a moving direction of the object to be tracked; and
   in response to the object to be tracked not being found in the peripheral image, the object to be tracked is recognized by using a single panoramic image acquired while rotating the UAV at a same place.

3. The UAV of claim 1, wherein the object recognition part detects the specific region from the peripheral image, acquired by the image input part, by using a Haar-like feature, increases a rate of determination of the detected specific region by using an AdaBoost learning algorithm, and sets coordinates of a window corresponding to the detected specific region to recognize the window as the object to be tracked.

4. The UAV of claim 3, wherein in response to the object to be tracked being a human, the specific region is a region corresponding to a face and an upper body.

5. The UAV of claim 1, wherein the object tracking part comprises:
    a tracker configured to track the object by using an extended Kalman filter;
    a detector configured to generate a plurality of search windows for an entire input image, and to determine whether the object to be tracked exists in each of the search windows by using a stepwise classification algorithm;
    a trainer configured to train the detector in successively input images by using a semi-supervised learning algorithm; and
    a combiner configured to combine results of the tracker and the detector to finally determine the position of the object to be tracked, and to transmit coordinates of the position of the object to be tracked to the drive controller.

6. The UAV of claim 5, wherein the stepwise classification algorithm applied to the detector enables real time processing by using a classification algorithm of a cascade structure that includes a patch variance, an ensemble classifier, and a nearest neighbor classifier.

7. The UAV of claim 1, further comprising a distance measuring part configured to store scale values of image data of the object to be tracked which is recognized by the object recognition part, and to compare changes in a size of the object to be tracked, so that a constant distance between the object to be tracked and the UAV is maintained.

8. The UAV of claim 1, further comprising an image storage configured to store image files captured in a photographing mode, and video files captured in a moving picture photographing mode, corresponding to a motion mode recognized by the motion recognition part.

9. A method of controlling an Unmanned Aerial Vehicle (UAV), which has an automatic tracking function to automatically track an object to be photographed, the method comprising:
    a photographing process of acquiring a peripheral image of the object to be photographed, wherein the peripheral image is an image of surrounding environment around the object;
    a specific region detection process of detecting a face region and an upper body region from the peripheral image acquired in the photographing process;
    an object recognition process of measuring coordinates of a window corresponding to the face region and the upper body region detected as the specific region to recognize the window as the object to be tracked;
    an object tracking process of controlling the UAV to track the object to be tracked, which is recognized in the object recognizing process, while maintaining a constant distance from the object to be tracked;
    a motion recognizing process of recognizing a motion of the object to be tracked to determine a picture photographing mode, a moving picture photographing mode, and a return mode; and
    a UAV driving process of driving the UAV corresponding to a motion mode recognized in the motion recognition process.

10. The method of claim 9, wherein the photographing process of acquiring the peripheral image of the object to be photographed comprises:
    acquiring the peripheral image of the object to be tracked by rotating the UAV in a moving direction of the object to be tracked; and
    in response to the object to be tracked not being found in the peripheral image, photographing by rotating the UAV at a same place.

11. The method of claim 9, wherein the specific region detecting process comprises detecting the specific region, which corresponds to the face region and the upper body region, from the peripheral image acquired in the photographing process by using a Haar-like feature, and increasing a rate of determination of the detected specific region by using an AdaBoost learning algorithm.

12. The method of claim 9, wherein the object tracking process comprises:
    tracking the object by using an extended Kalman filter;
    generating a plurality of search windows for an entire input image; and
    determining whether the object to be tracked exists in each of the search windows by using a stepwise classification algorithm of a cascade structure that includes a patch variance, an ensemble classifier, and a nearest neighbor classifier.

13. The method of claim 12, wherein the object tracking process comprises:
    storing scale values of image data of the object to be tracked;
    by using the stored scale values, sensing and storing changes in a size of the object to be tracked;
    by using the changes in the size of the object to be tracked, calculating movement coordinates of the UAV; and
    by using the calculated movement coordinates of the UAV, tracking the object to be tracked while maintaining a constant distance from the object to be tracked.

* * * * *